US006517753B1

(12) United States Patent
Bäckman et al.

(10) Patent No.: US 6,517,753 B1
(45) Date of Patent: Feb. 11, 2003

(54) METHOD AND DEVICE FOR FORMING A MAT OF PARTICLE BOARD

(75) Inventors: Lena Bäckman, Sundsvall (SE); Göran Lundgren, Alnö (SE); Leif H Andersson, Kvissleby (SE)

(73) Assignee: Valmet Fibertech AB (SE)

( * ) Notice: Subject to any disclaimer, the term of this patent is extended or adjusted under 35 U.S.C. 154(b) by 0 days.

(21) Appl. No.: 09/485,944

(22) PCT Filed: Jun. 16, 1998

(86) PCT No.: PCT/SE98/01152

§ 371 (c)(1), (2), (4) Date: Apr. 19, 2000

(87) PCT Pub. No.: WO99/11441

PCT Pub. Date: Mar. 11, 1999

(30) Foreign Application Priority Data

Aug. 28, 1997 (SE) ............................................. 9703124

(51) Int. Cl.$^7$ ............................................. B29B 17/00

(52) U.S. Cl. ................................ 264/37.29; 264/37.28; 264/109; 264/113; 425/81.1; 425/83.1; 425/449

(58) Field of Search ................................ 264/109, 113, 264/37.28, 37.29, 120; 425/81.1, 80.1, 83.1, 216, 217, 449, 447, 363, 371, 373, 182, 223, 224

(56) References Cited

U.S. PATENT DOCUMENTS 3,057,022 A 10/1962 Bar et al.
3,801,243 A * 4/1974 Smith et al. .................. 65/503

OTHER PUBLICATIONS

Definition: Recycle, "Academic Press Dictionary of Science and Technology" 1$^{st}$ Edition, Jan. 1992.*
Definition: Directly, "American Heritage® Dictionary of the English Language" 4$^{th}$ Edition, Apr. 2002.*

* cited by examiner

*Primary Examiner*—Jan H. Silbaugh
*Assistant Examiner*—Adam R. Harris
(74) *Attorney, Agent, or Firm*—Lerner, David, Littenberg, Krummholz & Mentlik, LLP

(57) ABSTRACT

A method and a device for continuous forming of a mat of particle lignocellulosic material by means of a batching unit (12) with a distribution chamber (15) in connection with the manufacture of board. The material is deposited on a continuous forming web (16), and the width of the mat is controlled by means of laterally movable partition walls (30) in the distribution chamber (15). The main part of the material is deposited on the forming web (16) between the partition walls (30), and the partial amount of the particle material dropping outside the partition walls (30) is diverted by means (32) and discharged separately in the distribution chamber (15) and re-used in the mat forming, in that it is directly placed as a surface layer of the mat by distribution means (35).

14 Claims, 3 Drawing Sheets

METHOD AND DEVICE FOR FORMING A MAT OF PARTICLE BOARD

This invention relates to a method and a device for the continuous forming of a mat of particle lignocellulosic material by depositing the material on a continuous forming web from a batching unit. The particle material can consist of chips or fibers for the manufacture of particle board or fiberboard, preferably of the type MDF (Medium Density Fiberboard).

The particle material in the form of wood chips or wood fibers manufactured in a desintegration plant is transported to a forming station, which comprises a batching unit for batching the material flow down on a continuous forming web, on which a mat of the particle material is formed. The mat is thereafter compressed in one or several presses, to which it is continuously transported by the forming web. The final pressing to a finished board takes place in a hot press.

In the board industry, a production plant for board is requested to be able to manufacture board of varying width in response to the specifications of the customer.

In conventional production plants different width are manufactured by first forming a mat on the forming web, thereafter compressing the mat and finally removing the edge strips by means of circular saws or mills. These edge strips are again desintegrated and then transported back to the batching system via pneumatic or other transporting means. This system usually is called "mat-trimming".

Mat-trimming has the disadvantage of high energy conumption, because it requires much energy for compressing, desintegration and transport. Furthermore, as a result of the staying-time of the particle material on the forming web and of the fact, that the material again must be desintegrated, the material has not the same quality as the main flow which is mixed at the re-circulation to the batching system. Another disadvantage is that at multi-layer forming, i.e. at forming stations where mats for board with special surface layers are manufactured, the fiber material intended for surface layers is mixed with fiber material intended for central layers at the recirculation to the batching system.

Further, according to U.S. Pat. No. 3,057,022 the width of the mat is adjusted by means of movable collecting devices on both sides of the forming web in the forming station. However, the collected material is returned to the material storage chamber by means of an extensive conveying system. Such system is complicated and the returned material will be mixed with new material which might be of different quality and result in uneven mat quality.

The present invention has the object to bring about a method and a device at board manufacture, where the board width can be adjusted in a simple manner and at the same time the afore-mentioned shortcomings are avoided. This is achieved according to the invention in that the intended board width is determined already at the forming of the mat in the outlet from the batching unit from where a partial amount of particle material is discharged and directly distributed and deposited as a layer in the mat. The characterizing features of the invention are apparent from the attached claims.

The invention is described in greater detail in the following, with reference to some embodiments shown in the drawings. The description refers to the MDF-process, but the invention can be applied also to the manufacture of other board.

FIG. 1 shows schematically a conventional plant for the manufacture of MDF;

FIG. 2 shows an apparatus according to the invention;

FIG. 3 shows a different embodiment by cross-section according to III—III in FIG. 2;

FIG. 4 is a cross-section according to IV—IV in FIG. 3;

FIG. 5 shows another embodiment of the invention.

The conventional plant shown in FIG. 1 is intended for the production of MDF. The plant comprises a storage bin 10 with an outfeeder 11, a batching unit 12 with a batching web 13, feed rolls 14 and a distribution chamber 15. Below the batching unit 12, an endless forming web 16 is provided which runs about a plurality of rolls 17, one of which is driving.

On the forming web 16 a fiber mat 18 is formed. A mat compressor 19 is located in connection to the forming web 16 and comprises upper and lower compression webs 20,21 as well as upper and lower compression rolls 22,23. After the mat compressor 19 a system for mat-trimming 24 is located. Thereafter a hot press 25 is provided for finally pressing the fiber mat to a finished board. A recycling system with a collector 26, transport line 27 and fan 28 is arranged for returning removed edge strips from the mat-trimming 22 to the storage bin 10.

FIG. 2 shows a device according to the invention. The batching unit 12 with the distribution chamber 15 is here formed with a width corresponding to the maximum width which a fiber mat can have. In the distribution chamber 15 vertical partition walls 30 are arranged, which extend in the direction of movement of the forming web and are offset in lateral direction. By these partition walls 30 the width of the fiber mat 18 and, thus, also the width of the finished board are determined. When mats and board of a smaller width are to be manufactured, the partition walls are moved inward whereby the distance between the walls is the intended mat-width. The partial amount of the fiber flow from the batching unit 10 which drops outside the movable partition walls 30, is taken care of in an expedient transport unit 32 for diverting the partial amount of the material in the distribution chamber 15.

At the embodiment shown in FIGS. 3 and 4, the transport unit 32 is formed with an opening 35, the width of which is adjusted together with the partition walls 30, so that it places the separated partial amount of the fiber flow on the upper side of the formed mat directly without re-circulation to the batching unit 12.

Another alternative is shown in FIG. 5. This embodiment differs from the embodiment according to FIGS. 3 and 4 in that it places the separated partial amount of the fiber flow on the forming web 16 before the distribution chamber 15, which implies that this layer will be located on the lower side of the fiber mat 18 formed by the distribution chamber 15.

The invention, thus, implies that the fiber material in its entirety can be utilized for the forming of a fiber mat, without any part of it having to pass through the mat compressor 19 or being recycled to the batching unit 12. The invention further implies that multi-layer board can be manufactured at optimum. At multi-layer forming one forming station is used for each layer. The diversion of the partial amount of the fiber flow which at the forming drops outside the intended board width implies, that is has the same quality as the fiber material in the main flow and, therefore, can be re-used in the same forming station without quality problems. According to the invention, no system for mat-trimming is needed and no extensive transport system for fiber recirculation. The energy demand for mat compression is reduced, because the formed mat has the intended width already from the start.

The invention, of course, is not restricted to the embodiments shown, but can be varied within the scope of the claims.

What is claimed is:

1. A method for forming a mat from particles of lignocellulosic-containing material comprising collecting said particles of lignocellulosic-containing material in a batching unit, dividing said collected particles of lignocellulosic-containing material by means of partition walls into a first portion of said particles of lignocellulosic-containing material between said partition walls and a second portion of said particles of lignocellulosic-containing material outside of said partition walls, depositing said first portion of said particles of lignocellulosic-containing material in the form of a mat onto a forming web whereby said partition walls determine the width of said mat, and directly depositing said second portion of said particles of lignocellulosic-containing material onto said forming web within said width of said mat, without recycling to the batching unit.

2. The method of claim 1 wherein said first portion of said particles of lignocellulosic-containing material comprises a major portion and said second portion of said particles of lignocellulosic material comprises a minor portion.

3. The method of claim 1 wherein said direct depositing of said second portion of said particles of lignocellulosic-containing material comprises depositing said second portion of said particles of lignocellulosic-containing material onto said first portion of said particles of lignocellulosic-containing material.

4. The method of claim 1 wherein said direct depositing of said second portion of said particles of lignocellulosic-containing material comprises depositing said second portion of said particles of lignocellulosic-containing material directly onto said forming web prior to said depositing of said first portion of said particles of lignocellulosic-containing material thereonto.

5. The method of claim 1 comprising collecting a plurality of separate batches of said particles of lignocellulosic-containing material in said batching unit, whereby said mat is formed comprising a plurality of layers of said separate batches of said particles of lignocellulosic-lignocellulosic-containing material comprises reusing said second portion of said particles of lignocellulosic-containing material in respective ones of said plurality of layers.

6. The method of claim 5 wherein said direct depositing of said second portion of said particles of lignocellulosic-containing material comprises reusing said second portion of said particles of lignocellulosic-containing material in respective ones of said plurality of layers.

7. A method for forming a mat from particles of lignocellulosic-containing material comprising collecting said particles of lignocellulosic-containing material in a batching unit, dividing said collected particles of lignocellulosic-containing material by means of partition walls into a first portion of said particles of lignocellulosic-containing material between said partition walls and a second portion of said particles of lignocellulosic-containing material outside of said partition walls, depositing said first portion of said particles of lignocellulosic-containing material in the form of a mat onto a forming web whereby said partition walls determine the width of said mat, and directly depositing said second portion of said particles of lignocellulosic-containing material onto said forming web within said width of said mat, whereby it is unnecessary to recycle said second portion of said particles of lignocellulosic-containing material and said direct depositing of said second portion of said particles of lignocellulosic-containing material comprises depositing said second portion of said particles of lignocellulosic-containing material directly onto said forming web prior to said depositing of said first portion of said particles of lignocellulosic-containing material thereonto.

8. Apparatus for forming a mat from particles of lignocellulosic-containing material comprising a batching unit for collecting said particles of lignocellulosic-containing material, a forming web, a distribution chamber for distributing said particles of lignocellulosic-containing material from said batching unit to said forming web to form said mat thereon, said distribution chamber including partition walls dividing said particles of lignocellulosic-containing material into a first portion of said particles of lignocellulosic-containing material between said partition walls and a second portion of said particles of lignocellulosic-containing material outside of said partition walls, whereby the width of said web is determined by the distance between said partition walls, and transport means for diverting said second portion of said particles of lignocellulosic-containing material for direct deposition onto said forming web at a location within said width of said mat without recycling to the batching unit.

9. The apparatus of claim 8 wherein said first portion of said particles of lignocellulosic-containing material comprises a major portion and said second portion of said particles of lignocellulosic-containing material comprises a minor portion.

10. The apparatus of claim 8 wherein said partition walls are adjustable whereby said width of said mat can be altered.

11. The apparatus of claim 8 wherein said transport means comprises means for directly depositing said second portion of said particles of lignocellulosic-containing material onto said first portion of said particles of lignocellulosic-containing material on said forming web.

12. The apparatus of claim 8 wherein said transport means comprises means for directly depositing said second portion of said particles of lignocellulosic-containing material onto said forming web prior to said depositing of said first portion of said particles of lignocellulosic-containing material thereonto.

13. The apparatus of claim 10 wherein said transport means includes a deposition opening having an adjustable width corresponding with said width defined by said partition walls.

14. Apparatus for forming a mat from particles of lignocellulosic-containing material comprising a batching unit for collecting said particles of lignocellulosic-containing material, a forming web, a distribution chamber for distributing said particles of lignocellulosic-containing material from said batching unit to said forming web to form a mat thereon, said distribution chamber including partition walls dividing said particles of lignocellulosic-containing material into a first portion of said particles of lignocellulosic-containing material between said partition walls and a second portion of said particles of lignocellulosic-containing material outside of said partition walls, whereby the width of said web is determined by the distance between said partition walls, and transport means for diverting said second portion of said particles of lignocelloulosic-containing material for direct deposition onto said forming web at a location within said width of said mat. Wherein said transport means comprises means for directly depositing said second portion of said particles of lignocellulosic-containing material onto said forming web prior to said depositing of said first portion of said particles of lignocellulosic-containing material thereonto.

* * * * *

UNITED STATES PATENT AND TRADEMARK OFFICE
CERTIFICATE OF CORRECTION

PATENT NO. : 6,517,753 B1 
DATED : February 11, 2003
INVENTOR(S) : Lena Backman, Göran Lundgren and Leif H. Andersson It is certified that error appears in the above-identified patent and that said Letters Patent is hereby corrected as shown below:

Title page,
Item [74], *Attorney, Agent or Firm*—"Krummholz" should read -- Krumholz --.

Column 3,
Line 41, insert -- . -- after "material"
Lines 41-43, delete "comprises reusing said second portion of said particles of lignocellulosic-containing material in respective ones of said plurality of layers. --

Signed and Sealed this

Twenty-fourth Day of February, 2004

JON W. DUDAS
*Acting Director of the United States Patent and Trademark Office*

UNITED STATES PATENT AND TRADEMARK OFFICE

CERTIFICATE OF CORRECTION

PATENT NO. : 6,517,753 B1 
APPLICATION NO. : 09/485944
DATED : February 11, 2003
INVENTOR(S) : Backman et al.

It is certified that error appears in the above-identified patent and that said Letters Patent is hereby corrected as shown below:

DELETE SPEC. COLUMNS 1-4 AND SUBSTITUTE THEREFORE THE SUB. SPEC. COLUMNS 1-6 AS SHOWN ON THE ATTACHED PAGES.

Signed and Sealed this

Seventh Day of November, 2006

JON W. DUDAS
*Director of the United States Patent and Trademark Office*

METHOD AND DEVICE FOR FORMING A MAT OF PARTICLE BOARD

BACKGROUND OF THE INVENTION

The present invention relates to a method and apparatus for the continuous forming of a mat of particles of lignocellulosic material by depositing the material on a continuous forming web from a batching unit. The particle material can consist of chips or fibers for the manufacture of particle board or fiberboard, preferably of the type MDF (Medium Density Fiberboard).

BACKGROUND OF THE INVENTION

The particle material in the form of wood chips or wood fibers manufactured in a disintegration plant is generally transported to a forming station, which comprises a batching unit for batching the material flow onto a continuous forming web, on which a mat of the particle material is thereby formed. The mat is thereafter compressed in one or several presses, to which it is continuously transported by the forming web. The final pressing into a finished board takes place in a hot press.

In the board industry, a production plant for such boards must be capable of manufacturing board of varying widths in response to the specifications of the customer.

In conventional production plants, different widths are manufactured by first forming a mat on the forming web, thereafter compressing the mat and finally removing the edge strips by means of circular saws or mills. These edge strips are again disintegrated and then transported back to the batching system by means of pneumatic or other transporting means. This system is generally referred to as "mat-trimming."

Mat-trimming has the disadvantage of high energy consumption, because it requires considerable energy for compressing, disintegration and transport. Furthermore, as a result of the staying-time of the particle material on the forming web, and the fact that the material must once again be disintegrated, the material does not have the same quality as the main flow which is mixed during the recirculation to the batching system. Another disadvantage is that during multi-layer forming, i.e., at forming stations where mats for board with special surface layers are manufactured, the fiber material intended for surface layers is mixed with fiber material which is intended for central layers during the recirculation to the batching system.

Further, according to U.S. Pat. No. 3,057,022 the width of the mat is adjusted by means of movable collecting devices on both sides of the forming web in the forming station. However, the collected material is returned to the material storage chamber by means of an extensive conveying system. Such a system is complicated, and the returned material will be mixed with new material which might be of different quality, and can thus result in uneven mat quality.

The present invention has the objective of a method and apparatus for use in board manufacture, where the board width can be adjusted in a simple manner, and at the same time the aforementioned shortcomings are avoided.

SUMMARY OF THE INVENTION

In accordance with the present invention, this and other objects have now been realized by the invention of a method for forming a mat from particles of lignocellulosic-containing material comprising collecting the particles of lignocellulosic-containing material in a batching unit, dividing the collected particles of lignocellulosic-containing material by means of partition walls into a first portion of the particles of lignocellulosic-containing material between the partition walls and a second portion of the particles of lignocellulosic-containing material outside of the partition walls, depositing the first portion of the particles of lignocellulosic-containing material in the form of a mat onto a forming web whereby the partition walls determine the width of the mat, and directly depositing the second portion of the particles of lignocellulosic-containing material from the batching unit onto the forming web within the width of the mat, whereby it is unnecessary to recycle the second portion of the particles of lignocellulosic-containing material. Preferably, the first portion of the particles of lignocellulosic-containing material comprises a major portion and the second portion of the particles of lignocellulosic material comprises a minor portion.

In accordance with one embodiment of the method of the present invention, the direct depositing of the second portion of the particles of lignocellulosic-containing material comprises depositing the second portion of the particles of lignocellulosic-containing material onto the first portion of the particles of lignocellulosic-containing material.

In accordance with another embodiment of the method of the present invention, the direct depositing of the second portion of the particles of lignocellulosic-containing material comprises depositing the second portion of the particles of lignocellulosic-containing material directly onto the forming web prior to the depositing of the first portion of the particles of lignocellulosic-containing material thereonto.

In accordance with another embodiment of the method of the present invention, the method includes collecting a plurality of separate batches of the particles of lignocellulosic-containing material in the batching unit, whereby the mat is formed comprising a plurality of layers of the separate batches of the particles of lignocellulosic-containing material. In a preferred embodiment, the direct depositing of the second portion of the particles of lignocellulosic-containing material comprises reusing the second portion of the particles of lignocellulosic-containing material in respective ones of the plurality of layers.

In accordance with the apparatus of the present invention, apparatus has been provided for forming a mat from particles of lignocellulosic-containing material comprising a batching unit for collecting the particles of lignocellulosic-containing material, a forming web, a distribution chamber for distributing the particles of lignocellulosic-containing material from the batching unit to the forming web to form a mat thereon, the distribution chamber including partition walls dividing the particles of lignocellulosic-containing material into a first portion of the particles of lignocellulosic-containing material between the partition walls and a second portion of the particles of lignocellulosic-containing material outside of the partition walls, whereby the width of the web is determined by the distance between the partition walls, and transport means for diverting the second portion of the particles of lignocellulosic-containing material for direct deposition onto the forming web at a location within the width of the mat. Preferably, the first portion of the particles of lignocellulosic-containing material comprises a major portion and the second portion of the particles of lignocellulosic-containing material comprises a minor portion.

In accordance with one embodiment of the apparatus of the present invention, the partition walls are adjustable whereby the width of the mat can be altered.

In accordance with another embodiment of the apparatus of the present invention, the transport means comprises means for directly depositing the particles of lignocellulosic-containing material onto the first portion of the particles of lignocellulosic-containing material on the forming web.

In accordance with another embodiment of the apparatus of the present invention, the transport means comprises means for directly depositing the particles of lignocellulosic-containing material onto the forming web prior to the depositing of the first portion of the particles of lignocellulosic-containing material thereonto.

In accordance with another embodiment of the apparatus of the present invention, the transport means includes a deposition opening having an adjustable width corresponding with the width defined by the partition walls.

The objects of the present method and apparatus are achieved by the intended board width having been determined during the forming of the mat in the outlet from the batching unit from which a partial amount of particle material is discharged and directly distributed and deposited as a layer in the mat.

BRIEF DESCRIPTION OF THE DRAWINGS

The present invention is described in greater detail in the following detailed description which, in turn, refers to embodiments shown in the drawings. The following description refers to the MDF process, but the present invention can be applied also to the manufacture of other board.

DETAILED DESCRIPTION

Figure 1:
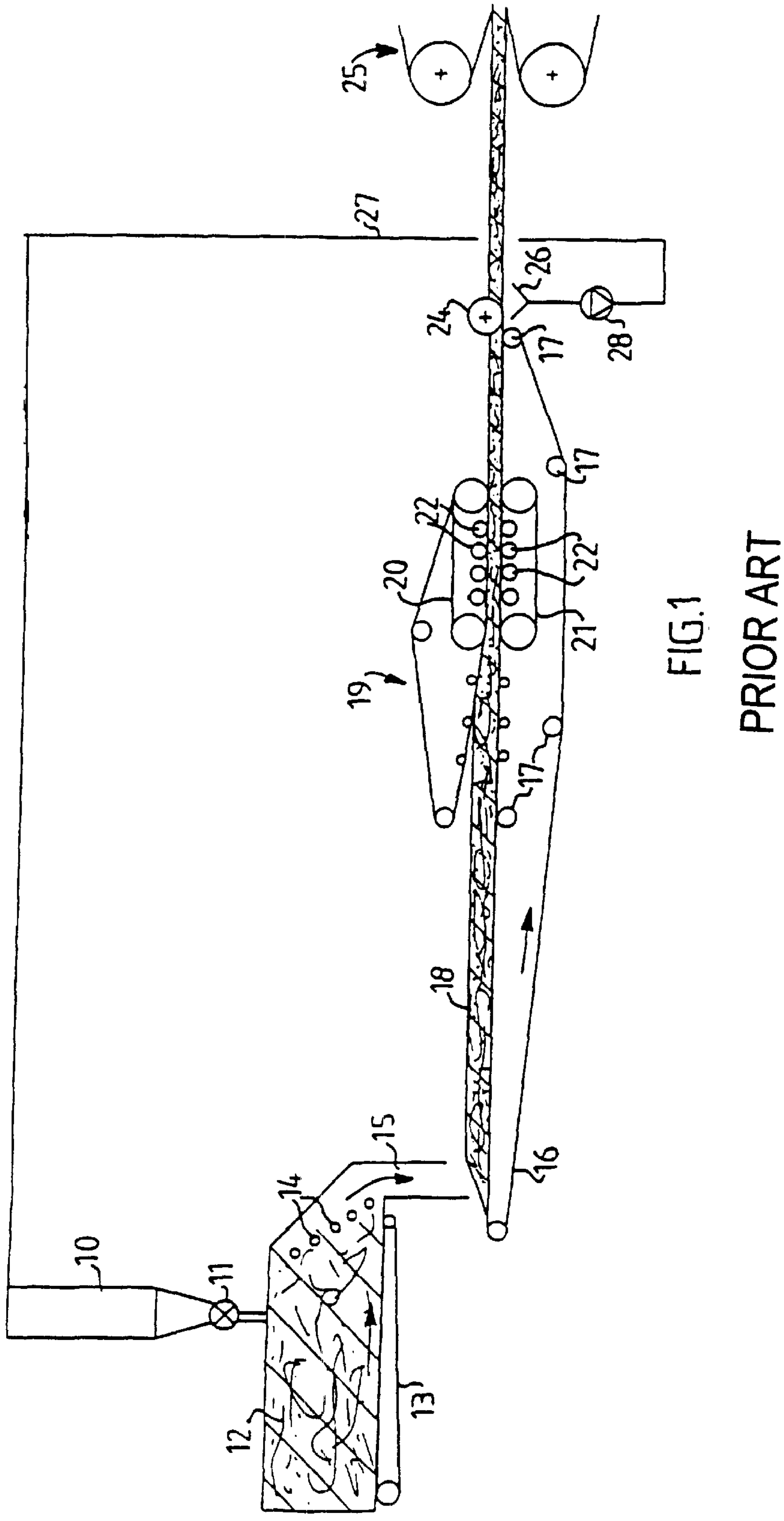
FIG.1 PRIOR ART
FIG. 1 is a side, elevational, schematic representation of a conventional plant for the manufacture of MDF.

A conventional plant is shown in FIG. 1, and is intended for the production of MDF. The plant comprises a storage bin 10 with an outfeeder 11, a batching unit 12 with a batching web 13, feed rolls 14 and a distribution chamber 15. Below the batching unit 12, an endless forming web 16 is provided which runs about a plurality of rolls 17, one of which is a driving roll.

On the forming web 16 a fiber mat 18 is formed. A mat compressor 19 is located adjacent to the forming web 16 and comprises upper and lower compression webs, 20 and 21, as well as upper and lower compression rolls, 22 and 23. Downstream of the mat compressor 19, a system for mat trimming 24 is located. Thereafter, a hot press 25 is provided for finally pressing the fiber mat into a finished board. A recycling system with a collector 26, transport line 27 and fan 28 is arranged for returning removed edge strips from the mat trimming 22 to the storage bin 10.

Figure 2:
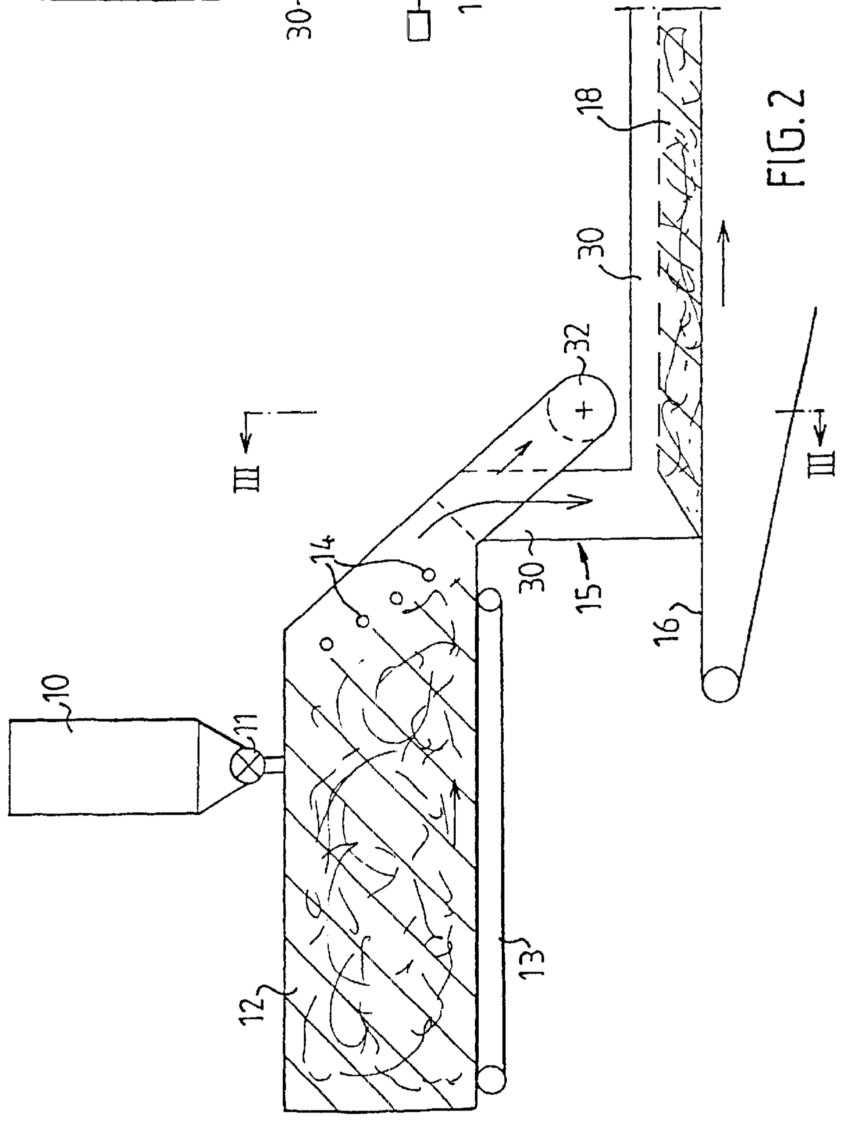
FIG. 2 is a side, elevational, schematic, cross-sectional representation of apparatus according to the present invention.

FIG. 2 shows a device according to the present invention. The batching unit 12 with the distribution chamber 15 is formed with a width corresponding to the maximum width which a fiber mat can have. In the distribution chamber 15, vertical partition walls 30 are arranged, which extend in the direction of movement of the forming web and are offset in the lateral direction. By these partition walls 30, the width of the fiber mat 18 and, thus, also the width of the finished board, are determined. When mats and board of a smaller width are to be manufactured, the partition walls are moved inward, whereby the distance between the walls remains as the intended mat width. The partial amount of the fiber flow from the batching unit 10, which drops outside of the movable partition walls 30, is handled in an expedient transport unit 32 for diverting the partial amount of the material in the distribution chamber 15.

Figure 3:
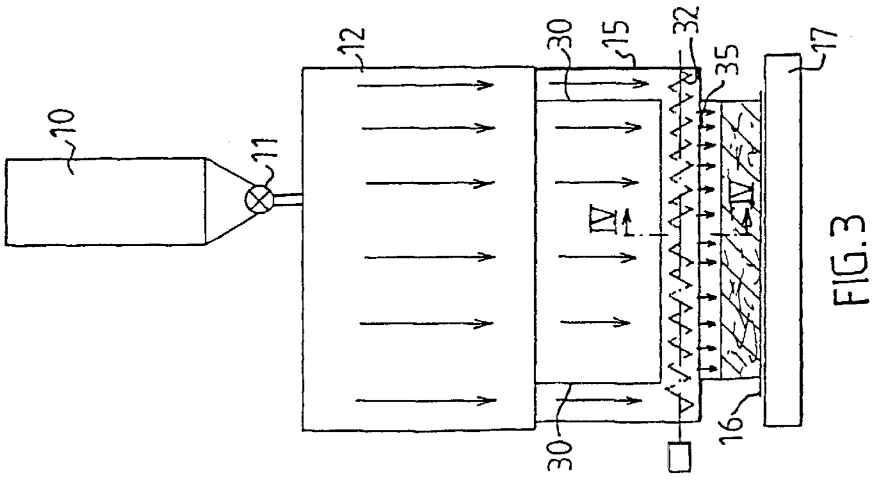
FIG. 3 is a front, elevational, schematic, cross-sectional representation of another embodiment taken along line III—III of FIG. 2.
Figure 4:
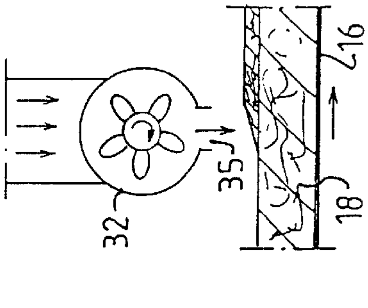
FIG. 4 is a side, elevational, cross-sectional view taken along line IV—IV of FIG. 3.

In the embodiment shown in FIGS. 3 and 4, the transport unit 32 is formed with an opening 35, the width of which is adjusted together with the partition walls 30, so that it places the separated partial amount of the fiber flow on the upper side of the formed mat directly without recirculation to the batching unit 12.

Figure 5:
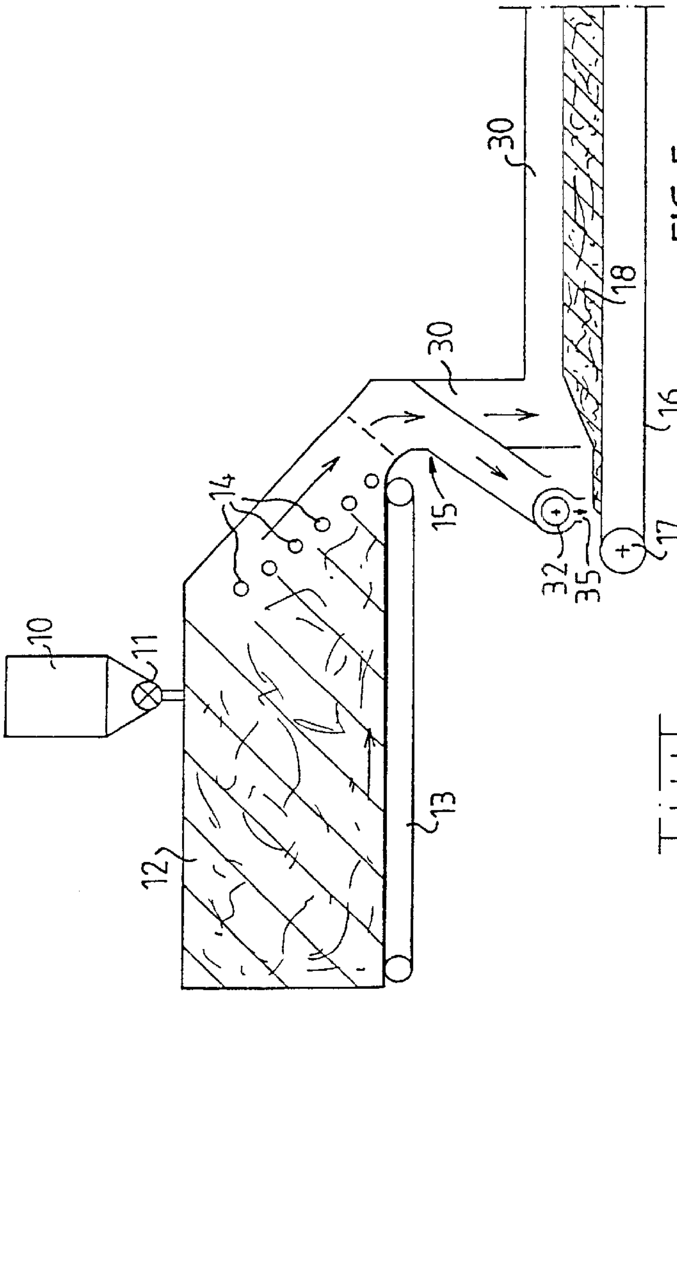
FIG. 5 is a side, elevational, schematic representation of another embodiment of the present invention.

Another alternative is shown in FIG. 5. This embodiment differs from the embodiment according to FIGS. 3 and 4 in that it places the separated partial amount of the fiber flow on the forming web 16 before or upstream of the distribution chamber 15, which implies that this layer will be located on the lower side of the fiber mat 18 formed by the distribution chamber 15.

The present invention thus implies that the fiber material in its entirety can be utilized for the forming of a fiber mat, without any part of it having to pass through the mat compressor 19 or being recycled to the batching unit 12. The present invention further implies that the manufacture of multi-layer board can be optimized. During multi-layer forming one forming station is used for each layer. The diversion of the partial amount of the fiber flow which, during forming, drops outside the intended board width implies that it has the same quality as the fiber material in the main flow and, therefore, can be reused in the same forming station without quality problems. According to the present invention, no system for mat trimming is needed and no extensive transport system for fiber recirculation. The energy demand for mat compression is reduced because the formed mat already has the intended width from the start.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for forming a mat from particles of lignocellulosic-containing material comprising collecting said particles of lignocellulosic-containing material in a batching unit, dividing said collected particles of lignocellulosic-containing material by means of partition walls into a first portion of said particles of lignocellulosic-containing material between said partition walls and a second portion of said particles of lignocellulosic-containing material outside of said partition walls, depositing said first portion of said particles of lignocellulosic-containing material in the form of a mat onto a forming web whereby said partition walls determine the width of said mat, and directly depositing said second portion of said particles of lignocellulosic-containing material onto said forming web within said width of said mat, without recycling to the batching unit.

2. The method of claim 1 wherein said first portion of said particles of lignocellulosic-containing material comprises a major portion and said second portion of said particles of lignocellulosic material comprises a minor portion.

3. The method of claim 1 wherein said direct depositing of said second portion of said particles of lignocellulosic-containing material comprises depositing said second portion of said particles of lignocellulosic-containing material onto said first portion of said particles of lignocellulosic-containing material.

4. The method of claim 1 wherein said direct depositing of said second portion of said particles of lignocellulosic-containing material comprises depositing said second portion of said particles of lignocellulosic-containing material directly onto said forming web prior to said depositing of said first portion of said particles of lignocellulosic-containing material thereonto.

5. The method of claim 1 comprising collecting a plurality of separate batches of said particles of lignocellulosic-containing material in said batching unit, whereby said mat is formed comprising a plurality of layers of said separate batches of said particles of lignocellulosic-containing material.

6. The method of claim 5 wherein said direct depositing of said second portion of said particles of lignocellulosic-containing material comprises reusing said second portion of said particles of lignocellulosic-containing material in respective ones of said plurality of layers.

7. A method for forming a mat from particles of lignocellulosic-containing material comprising collecting said particles of lignocellulosic-containing material in a batching unit, dividing said collected particles of lignocellulosic-containing material by means of partition walls into a first portion of said particles of lignocellulosic-containing material between said partition walls and a second portion of said particles of lignocellulosic-containing material outside of said partition walls, depositing said first portion of said particles of lignocellulosic-containing material in the form of a mat onto a forming web whereby said partition walls determine the width of said mat, and directly depositing said second portion of said particles of lignocellulosic-containing material onto said forming web within said width of said mat, whereby it is unnecessary to recycle said second portion of said particles of lignocellulosic-containing material and said direct depositing of said second portion of said particles of lignocellulosic-containing material comprises depositing said second portion of said particles of lignocellulosic-containing material directly onto said forming web prior to said depositing of said first portion of said particles of lignocellulosic-containing material thereonto.

8. Apparatus for forming a mat from particles of lignocellulosic-containing material comprising a batching unit for collecting said particles of lignocellulosic-containing material, a forming web, a distribution chamber for distributing said particles of lignocellulosic-containing material from said batching unit to said forming web to form said mat thereon, said distribution chamber including partition walls dividing said particles of lignocellulosic-containing material into a first portion of said particles of lignocellulosic-containing material between said partition walls and a second portion of said particles of lignocellulosic-containing material outside of said partition walls, whereby the width of said web is determined by the distance between said partition walls, and transport means for diverting said second portion of said particles of lignocellulosic-containing material for direct deposition onto said forming web at a location within said width of said mat without recycling to the batching unit.

9. The apparatus of claim 8 wherein said first portion of said particles of lignocellulosic-containing material comprises a major portion and said second portion of said particles of lignocellulosic-containing material comprises a minor portion.

10. The apparatus of claim 8 wherein said partition walls are adjustable whereby said width of said mat can be altered.

11. The apparatus of claim 8 wherein said transport means comprises means for directly depositing said second portion of said particles of lignocellulosic-containing material onto said first portion of said particles of lignocellulosic-containing material on said forming web.

12. The apparatus of claim 8 wherein said transport means comprises means for directly depositing said second portion of said particles of lignocellulosic-containing material onto said forming web prior to said depositing of said first portion of said particles of lignocellulosic-containing material thereonto.

13. The apparatus of claim 10 wherein said transport means includes a deposition opening having an adjustable width corresponding with said width defined by said partition walls.

14. Apparatus for forming a mat from particles of lignocellulosic-containing material comprising a batching unit for collecting said particles of lignocellulosic-containing material, a forming web, a distribution chamber for distributing said particles of lignocellulosic-containing material from said batching unit to said forming web to form a mat thereon, said distribution chamber including partition walls dividing said particles of lignocellulosic-containing material into a first portion of said particles of lignocellulosic-containing material between said partition walls and a second portion of said particles of lignocellulosic-containing material outside of said partition walls, whereby the width of said web is determined by the distance between said partition walls, and transport means for diverting said second portion of said particles of lignocellulosic-containing material for direct deposition onto said forming web at a location within said width of said mat, wherein said transport means comprises means for directly depositing said second portion of said particles of lignocellulosic-containing material onto said forming web prior to said depositing of said first portion of said particles of lignocellulosic-containing material thereonto.

* * * * *